United States Patent [19]
Neville

[11] 3,968,904
[45] July 13, 1976

[54] CONTINUOUS MEASUREMENT OF THE BULK DENSITY OF PARTICULATE MATERIAL

[75] Inventor: Richard Ernest Gartside Neville, Sailsbury, England

[73] Assignee: AMF Incorporated, White Plains, N.Y.

[22] Filed: Mar. 10, 1975

[21] Appl. No.: 557,208

[30] Foreign Application Priority Data
Mar. 12, 1974 United Kingdom............... 10862/74

[52] U.S. Cl.................................. 222/25; 222/64; 222/77; 222/55
[51] Int. Cl.²......................................... B67D 5/06
[58] Field of Search ................. 222/55, 56, 64, 71, 222/77; 198/37, 39; 131/21 A, 22 R, 108; 177/121

[56] References Cited
UNITED STATES PATENTS
| | | | |
|---|---|---|---|
| 3,276,452 | 10/1966 | Dearsley | 131/21 |
| 3,631,961 | 1/1972 | Strydom | 198/37 |
| 3,665,932 | 5/1972 | Goldbach | 131/21 A |

*Primary Examiner*—Allen N. Knowles
*Attorney, Agent, or Firm*—George W. Price; Charles J. Worth

[57] ABSTRACT

Apparatus for continuously measuring the bulk density of particulate material such as cut tobacco comprising a measuring column with level detection and density indicating means, a weighing conveyor and control means for driving the conveyor at speeds determined by signals from the level detecting means.

13 Claims, 4 Drawing Figures

CONTINUOUS MEASUREMENT OF THE BULK DENSITY OF PARTICULATE MATERIAL

This invention relates to an apparatus for the continuous measurement of the bulk density of particulate material, such as cut tobacco.

In cigarette manufacturing it is desirable to obtain the maximum yield of cigarettes of a given firmness per pound of tobacco. Therefore, the bulk density and hence the related filling power of the tobacco is an important factor.

Filling power is normally measured on the finished cigarette by measuring the firmness of 10 cigarettes of standard weight volume and moisture content. The firmness test is carried out by placing 10 cigarettes side by side on a horizontal table below a round horizontal bar with the axis at right angles to that of the cigarettes and carried in a vertical slide. To measure the firmness the round bar or foot is pressed onto the cigarettes with a standard load for a standard time and the indentation is thereafter measured.

The filling power or firmness of bulk cut tobacco is measured by similar apparatus, but in this instance a known weight of tobacco is put in a vertical cylinder and the round bar is replaced by a vertical sliding piston. The piston is pressed on to the tobacco for a predetermined time with a predetermined load and the displacement measured. Small displacement indicate a large degree of firmness or filling power.

From the above tests it can be seen that bulk cut tobacco is not a very elastic material and that compression of tobacco is dependant on load and time.

The cigarette firmness test is the normal criterion of tobacco filling power which can only be measured after cigarettes have been made. However, there is a correlation between the cigarette firmness test and the bulk firmness test which can be made before manufacturing cigarettes.

It has been found that the way in which the leaf is processed prior to manufacture has an effect on the filling power and, in particular, the amount of air or air flow used in a rotary drier.

In a rotary drier having heated cylinder with or without paddles, air is passed through the drier primarily to carry off the evaporated moisture, and secondarily but not necessarily to add some additional heat for drying. As the air flow is reduced its temperature rises to carry the moisture, and the tobacco temperature also rises producing a hot steamy condition within the drier. Tobacco dried in this way has enhanced filling power.

To monitor and control this filling power enhancement it becomes necessary to continuously measure the filling power of the tobacco and, therefore, it is an object of the present invention to provide improved means for continuously measuring the bulk filling power or firmness of tobacco, in particular cut tobacco.

According to the invention apparatus is provided for the continuous measurement of the bulk density of particulate material comprising a weighing conveyor, drive means for said weighing conveyor, a measuring column disposed above said conveyor for delivering particulate material to said conveyor, a level detection means disposed adjacent said measuring column, density indicating means, and a controller for receiving signals from said level detector means proportional to the level of the particulate material and for varying the speed of said drive means in accordance with said signals to maintain a substantially constant level of material within the measuring column independant of variations of supply to said column; wherein the indicating means is controlled by signals from said weighing conveyor.

A tobacco metering device is known comprising a variable speed weighing conveyor such as described in British Pat. No. 1,241,572 assigned to the same assignee as is the present application, fed from a gravimetric feed or metering pipe. In such known arrangements the weight signal is multiplied by the belt speed signal to give a flow rate measurement independent of the belt speed. For automatic control the flow rate signal is compared with a desired flow rate and the belt speed varied so as to maintain a constant flow rate of material from the tube. In the present invention, only the weight is measured to give an indication of density and hence filling power, and the level of material in the column is maintained by varying the speed of the weighing conveyor.

The belt speed of the weighing conveyor determines the weight of material drawn from the metering tube. With cohesive materials such as cut tobacco, the stream is drawn from the tube and bends at the junction with the weighing conveyor so the stream on the weighing conveyor is the same stream which was in the tube.

The foregoing and other objects and advantages will appear more fully hereinafter from a consideration of the detailed description wherein one embodiment of the invention is illustrated by way of example. It is to be expressly understood, however, that the drawing is for illustration purposes only and is not to be construed as defining the limits of the invention.

Figure 1:
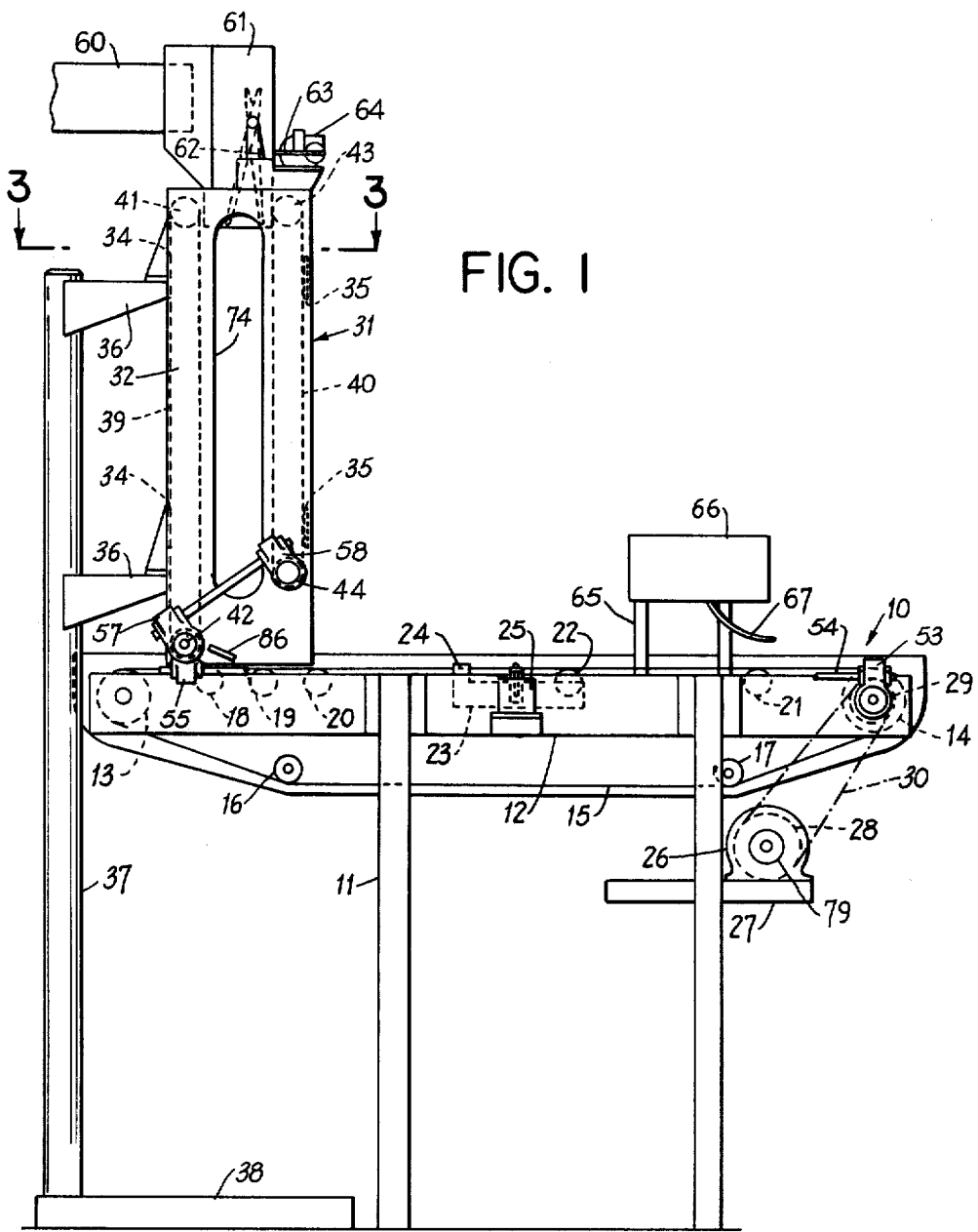
FIG. 1 is a side elevation of apparatus in accordance with the present invention and only a portion of the vibrator feed conveyor being shown.
Figure 2:
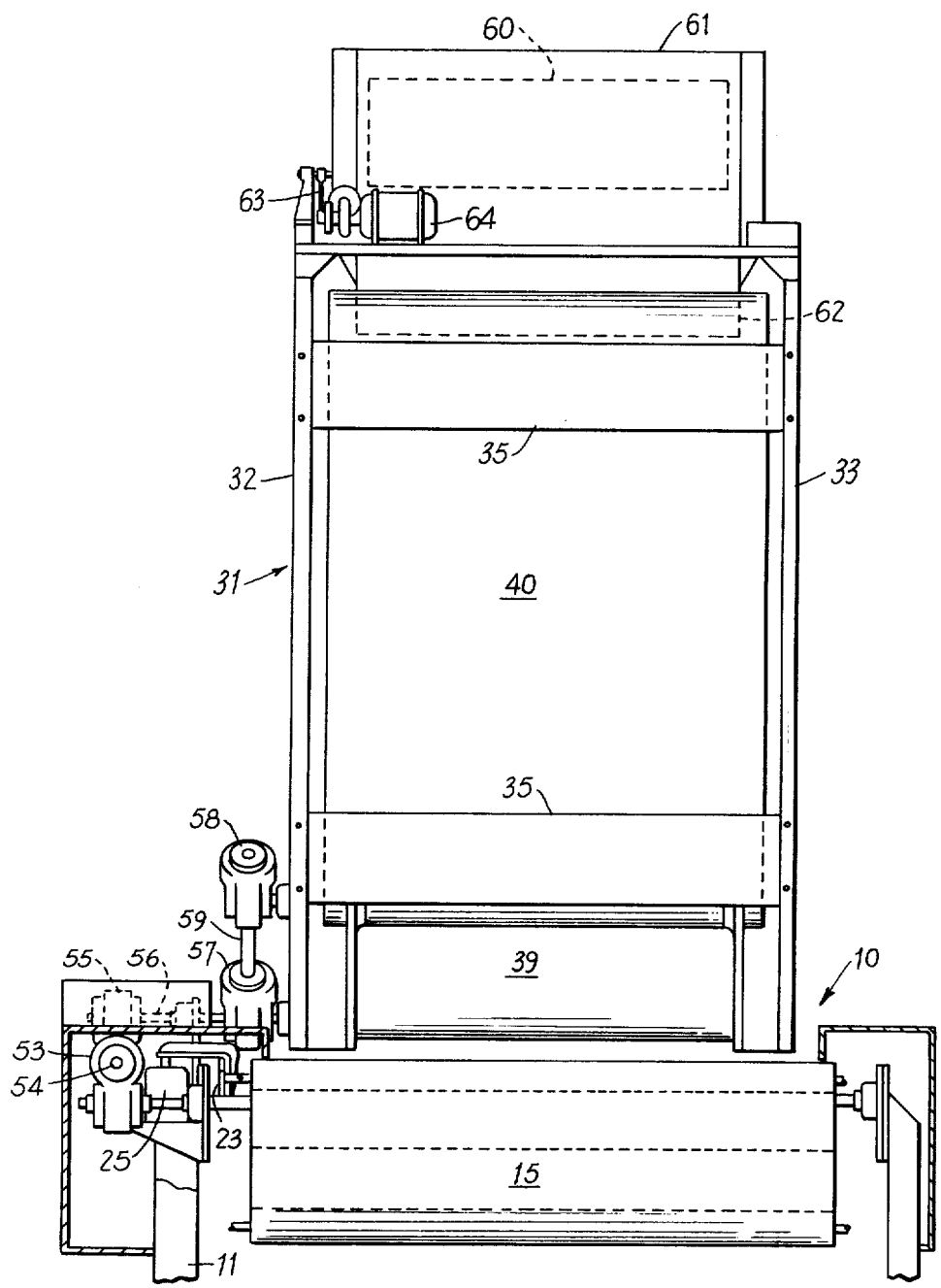
FIG. 2 is an enlarged end elevation of the apparatus of FIG. 1.

A weighing conveyor 10 shown generally in FIG. 1 comprises a frame work 11 having at its upper end a pair of spaced side plates 12 between which are supported or rotatably mounted two main supporting rollers 13 and 14 around which passes an endless conveyor belt 15.

At the lower run of the belt 15 are provided idling or tensioning rollers 16 and 17 while at the upper run of the belt there are provided on fixed axes several secondary support rollers 18, 19, 20 and 21, positioned as shown. A sensing roller 22 spaced between rollers 20 and 21 beneath the upper run of belt 15, is carried at one end of a pair of arms 23 pivoted at 24 which is disposed in plane of the upper run of the belt 15. The arms 23 are connected to a transducer strain guage 25 mounted on one of the side plates 12. The weighing span of the conveyor is limited to the area of belt 15 disposed between the two rollers 20 and 21 each being disposed on one side of the sensing roller 22 opposite from the other.

The conveyor 10 or the belt 15 is driven by a variable speed motor 26 mounted on a bracket 27; the drive being effected through pulleys 28 and 29, and a belt (or chain) 30.

A measuring column 31 comprises a box like structure formed by a spaced pair of side plates 32 and 33 which are connected together by top and bottom back plates 34 and top and bottom front plates 35.

The measuring column is supported by upper and lower webs or arms 36 radiating from a tubular post 37 upstanding from or supported on a base member 38. A pair of endless belts 39 and 40 are mounted on spaced pairs of transverse sprocketed roller 41 and 42, and 43 and 44. The lower end of one belt 40 at roller 44 is at a level higher than the lower end of the other belt 39 at roller 42 to provide an outlet for the tobacco delivered to belt 15. The upper and lower sprocketed rollers 41 and 42 are in driving connection with each other by chains 49 and 51, and rollers 43 and 44 by chains 50 and 52.

The tobacco is confined within the region of the belts by side walls 73 which are supported by plates 32 and 33, and provided with elongated apertures or windows 74. The belts 39 and 40 in this example are arranged in parallel disposition but may converge to give a small compression to the tobacco to overcome the tendancy of the stream to break at the junction of the tube and the conveyor belt 15.

The drive for the belts 39 and 40 is provided by the drive of the conveyor belt roller 14 through a gearbox 53, a drive shaft 54 extending along the length of the weighing conveyor 10 to a gearbox 55, the output shaft 56 of which drives a third gearbox 57 which is also coupled to the shaft of the sprocketed roller 42 and the shaft of sprocketed roller 44 through a shaft 59 and a fourth gearbox 58. The two belts 39 and 40 of the measuring tube 31 are therefore provided with a positive driving connection with the conveyor belt 15 of the weighing conveyor 10.

The measuring tube 31 is disposed above the upstream end of the conveyor belt 15 with the lower end of its belt 39 inclose proximity thereto and positioned above the region of the support rollers 18, 19 and 20, while the lower end of its belts 40 is spaced from belt 15.

A vibratory feed conveyor 60 (shown in part) has its outlet end entering a chute 61 located within the upper end of the measuring tube 31. Within the chute 61 is provided a pivoted plate 62 which can be reciprocated by a crank arm 63 passing through the chute wall and driven by a motor 64.

Mounted on legs 65 extending upwardly from the side plates 12 adjacent the delivery end of the conveyor 10 is a moisture sensing apparatus 66 having a pair of resistance probes 67 (only one shown).

For proper operation, the gearing and drive mechanisms or means are selected so that the speed of the drive of the belts 39 and 40 in the tube 31 is the same as the speed of the belt 15 of the weighing conveyor 10.

Figures 3, 4:
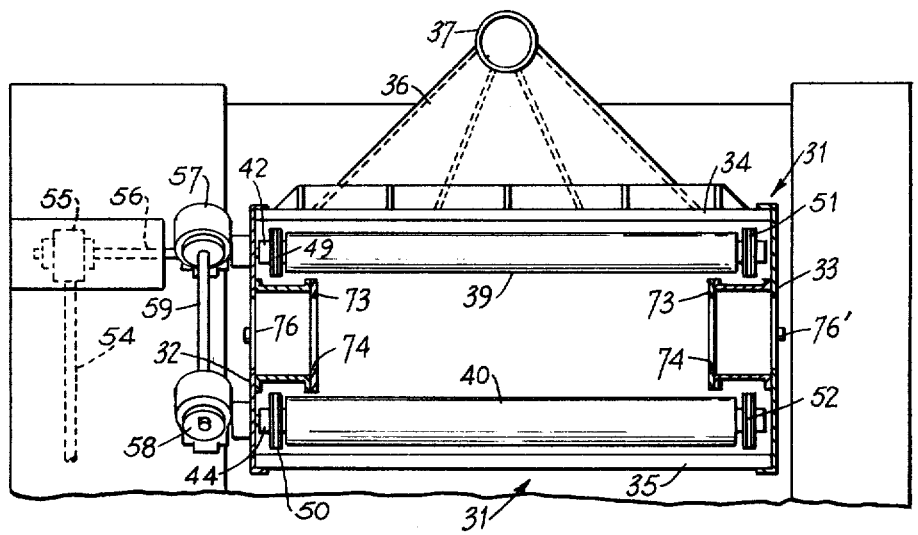
FIG. 3 is a sectional view taken on line 3—3 of FIG. 1.
FIG. 4 is a schematic side elevation of the novel apparatus including a block circuit diagram of the controls therefor.

The tobacco is fed by the vibratory conveyor 60 through the chute 61 to the measuring tube 31 wherein the reciprocating plate 62 in the chute 61 insures even spreading of the tobacco and preventing cavities from forming in the tobacco in the tube 31. The level of the tobacco within the measuring tube 31 is maintained within a region at about 75% of the height of the tube by means of a detecting device located adjacent to or outside of the apertures or windows 74. The level detecting device, shown schematically in FIG. 4, comprises adjacent one of the windows 74 a vertical array of photo diodes 76 or alternatively photoelectric cells arranged opposite a light source 76' disposed adjacent to the other of the windows 74. Alternatively a capacitive plate may be arranged opposite an aperture 74. Signals from the detecting means 76–76' proportional to the height of the tobacco level in the tube 31 are fed to a level indicator, and controller 77 which in turn provides a controlling signal to a speed controller 78.

The level indicator and controller 77 gives an output speed controlling signal dependant upon the difference between predetermined (desired) mean level and the detected level which is proportional to the time integral of the deviation or detected difference. The signals from the photo diodes or photo sensors 76 may be smoothed to overcome short term fluctuations in level. The speed controller 78 has an output connected to control the speed of the motor 26 and an input which receives a feedback signal from a tacho generator 79 driven by the motor 26.

The output from the transducer 25 is fed to a correcting circuit 80 which also receives the feedback signal from the tacho generator 79 as a speed correcting signal via a proportional controller 82. The output of the correcting circuit 80 controls a voltmeter 81 calibrated to indicate density or filling power.

The metering tube 31 accepts whatever flow is fed to it and an accurate tobacco level is maintained by means of the vertical array of diodes or sensors 76 which give a signal proportional to the level in small steps. This signal is fed via the speed controller 78 to the weighing conveyor motor 26 so as to maintain a constant level in the tube 31 by conveying more or less tobacco away from the tube.

The weight signal from the transducer 25 (without multiplication by the belt speed) is a measure of the weight of tobacco on the weigh span located between rollers 20 and 21, but the cross section of the tobacco on the weighing conveyor 10 is a reflection of the constant cross section of the tube 31, so the weight signal is a measure of the bulk density of the material.

By maintaining a constant tobacco level in the tube 31 and by feeding a substantially constant flow of tobacco to the tube 31 the natural settling or compression of the bulk tobacco which occurs with time under its own weight is kept constant. In this way a measure of filling power of similar nature to the bulk tobacco test above is made continuously. A small weight indicates a small density but a large filling power.

By calibration of the equipment for varying flows the speed correction to the density measurement based on a belt speed measurement can be ascertained. The correction allows for the variation of settling time with change of belt speed.

The use of belts 39 and 40 in the tube 31 enables friction to be overcome within the tube. However, it is possible to use a measuring tube having otherwise fixed walls. To overcome the tendency of the tobacco stream to break or shear at the junction of the tube 31 with the weighing conveyor 10, a pair of squeeze rollers (not shown) can be incorporated at the lower end of the measuring tube 31 which are coupled to and run at the same surface speed at the belt 15.

The squeeze rollers would be spaced from the conveyor 10 at a distance equal to the space between the opposed belts 39 and 40 within the tube 31.

The output to the filling power indicator (voltmeter) 81 may additionally be used to monitor and control the air flow in a drier to insure that the filling power, which is related to moisture content is maintained.

The correcting circuit 80 may have a further correcting input from a further proportional controller 83 which receives the output signal from a moisture meter 84. The moisture meter 84 receives signals from the moisture sensing device 66 and a temperature sensor 86. The proportional controller 83 is also influenced by an output signal from a temperature sensor 86 over a line 85.

The novel apparatus would normally be used after a tobacco drying and cooling system with automatic moisture control, so that the effects of moisture content variation on bulk density is avoided.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An apparatus for the continuous measurement of the bulk density of particulate material, comprising a conveyor, means for weighing particulate material on said conveyor, drive means for said conveyor, a measuring column disposed above said conveyor for delivering particulate material to said conveyor, input feeder means for particulate material to said measuring column, a level detection disposed adjacent said measuring column, density indicating means, and a controller for receiving signals from said level detector proportional to the level of the particulate material and for varying the speed of said drive means in dependance upon said signals to maintain a substantially constant level of material within the measuring column independent of variations of supply to said column; wherein the indicating means is controlled by signals from said weighing means.

2. An apparatus as claimed in claim 1, wherein means are provided for generating a signal proportional to the speed of the conveyor for effecting a correction of the signals from the weighing means to the indicating means.

3. An apparatus as claimed in claim 2, wherein means are provided between said signal generating means and said indicating means to effect proportional control of the indicating means.

4. An apparatus as claimed in claim 3, wherein the measuring column is provided with a pair of opposed belts arranged substantially vertically, and means for driving said rollers at a peripheral speed equal to the speed of travel of the conveyor.

5. An apparatus as claimed in claim 4, wherein the means for driving the belts comprises a first shaft in driving connection with both belts and a second shaft coupled by gearing to the drive means for the conveyor.

6. An apparatus as claimed in claim 5, wherein the level detector comprises an array of photo sensors vertically disposed adjacent one side of the measuring column and a light source is disposed adjacent the other side.

7. An apparatus as claimed in claim 6, wherein said array is disposed at a level substantially 75% of the height of the column.

8. An apparatus as claimed in claim 5, wherein the level detector comprises photoelectric cells and a light source disposed at one side of the measuring column.

9. An apparatus as claimed in claim 8, wherein the signals from the weighing means are produced by a transducer having a mechanical input effected by a roller engaging the under side of the upper run of the conveyor.

10. An apparatus as claimed in claim 9, wherein the roller is mounted on an arm pivoted on an axis in the plane of the upper run of the conveyor.

11. An apparatus as claimed in claim 5, wherein the level detector comprises photoelectric cells and a capacitance plate disposed at one side of the measuring column.

12. An apparatus as claimed in claim 11, wherein the signals from the weighing means are produced by a transducer having a mechanical input effected by a roller engaging the under side of the upper run of the conveyor.

13. An apparatus as claimed in claim 12, wherein the roller is mounted on an arm pivoted on an axis in the plane of the upper run of the conveyor.

* * * * *